United States Patent
Lee et al.

(10) Patent No.: US 8,296,020 B2
(45) Date of Patent: Oct. 23, 2012

(54) USE OF SELECTABLE ONE-WAY CLUTCH IN HYBRID POWERTRAIN

(75) Inventors: Chunhao J. Lee, Troy, MI (US); Farzad Samie, Franklin, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/020,852

(22) Filed: Feb. 4, 2011

(65) Prior Publication Data

US 2012/0203403 A1    Aug. 9, 2012

(51) Int. Cl.
*G06F 17/00* (2006.01)
*B60K 6/20* (2007.10)

(52) U.S. Cl. ........................ 701/51; 180/65.21
(58) Field of Classification Search .............. 701/22, 701/51, 58, 67; 475/5, 8; 477/5, 37, 39, 477/41, 70, 74, 166, 169, 174, 175, 179; 180/65.1, 65.21, 337
See application file for complete search history.

(56) References Cited

U.S. PATENT DOCUMENTS

| | | | | |
|---|---|---|---|---|
| 6,558,289 B2* | 5/2003 | Chung | ................................ | 477/3 |
| 2010/0234159 A1* | 9/2010 | Lee et al. | .......................... | 475/5 |
| 2011/0009236 A1* | 1/2011 | Yang et al. | ........................ | 477/5 |

OTHER PUBLICATIONS

U.S. Appl. No. 12/884,907, Diemer et al.
U.S. Appl. No. 12/956,254, Samie et al.
Samie, F., "Selectable One-Way Clutch in GM's RWD 6-Speed Automatic Transmissions", SAE 2009-01-0509, SAE International, 2009.

* cited by examiner

*Primary Examiner* — James Trammell
*Assistant Examiner* — Muhammad Shafi (57) ABSTRACT

A powertrain includes a plurality of torque generative devices and a transmission having an output shaft, a plurality of planetary gear sets connecting the torque generative devices to the output shaft, and a selectable one-way clutch connected to a first of the planetary gear sets. A method to control the powertrain includes monitoring a desired transmission setting selection comprising one of a low range continuously variable gear mode, a high range continuously variable gear mode, and a fixed gear mode, determining a desired state for the selectable one-way clutch based upon the desired transmission setting selection, and actuating the selectable one-way clutch to effect the desired state for the selectable one-way clutch.

15 Claims, 4 Drawing Sheets

USE OF SELECTABLE ONE-WAY CLUTCH IN HYBRID POWERTRAIN

TECHNICAL FIELD

This disclosure is related to a system and method for controlling a hybrid powertrain.

BACKGROUND

The statements in this section merely provide background information related to the present disclosure and may not constitute prior art.

A powertrain includes a torque generative device providing torque to spin an output shaft. A hybrid powertrain utilizes at least two torque generative devices. Hybrid powertrains frequently include a number of methods to utilize the torque generative devices, for example, including a method to select a torque generative device to drive the output shaft, to change the torque generative device driving the output shaft, to select a plurality of torque generative devices to simultaneously drive the output shaft, to utilize one torque generative device to drive another torque generative device, to ground a torque generative device, and to allow the output shaft to spin freely or free-wheel. One exemplary powertrain includes an internal combustion engine and a first and second electric motor, each selectively providing or receiving torque through the powertrain configuration.

Known powertrains include one or more planetary gear sets. Clutch devices known in the art can selectively connect and disconnect various shafts and planetary gear members within the powertrain. As a result of connections and disconnections, various gear ratios and distinct configurations of inputs can be utilized to transmit torque through the resulting powertrain configuration.

Planetary gear sets and clutch devices are utilized within a powertrain as part of a transmission to provide a number of gear states based upon the configuration of the engaged and disengaged clutches. An exemplary two mode hybrid drive transmission includes a first and a second variable gear ratio states and a fixed gear ratio state, wherein the various gear states are selected by engaging and disengaging clutches within the transmissions.

Hydraulic pressure can be utilized to actuate a clutch. In an exemplary clutch utilizing hydraulic pressure in combination with pistons selectively applying force based upon the hydraulic pressure, an exemplary shift between states controlled by a pair of clutches requires that one clutch be unloaded, permitting two shafts that were previously coupled to spin freely of each other, and subsequently that another clutch be loaded, coupling two shafts that were formerly decoupled or free to spin relative to one another. Such hydraulically actuated clutches frequently include clutch plates that are spring loaded to a default decoupled position, and hydraulic pressure applied to an associated piston applies pressure that overcomes the bias of the spring to bring the plates to a coupled position.

SUMMARY

A powertrain includes a plurality of torque generative devices and a transmission having an output shaft, a plurality of planetary gear sets connecting the torque generative devices to the output shaft, and a selectable one-way clutch connected to a first of the planetary gear sets. A method to control the powertrain includes monitoring a desired transmission setting selection comprising one of a low range continuously variable gear mode, a high range continuously variable gear mode, and a fixed gear mode, determining a desired state for the selectable one-way clutch based upon the desired transmission setting selection, and actuating the selectable one-way clutch to effect the desired state for the selectable one-way clutch.

BRIEF DESCRIPTION OF THE DRAWINGS

One or more embodiments will now be described, by way of example, with reference to the accompanying drawings, in which.

DETAILED DESCRIPTION

Figure 1:
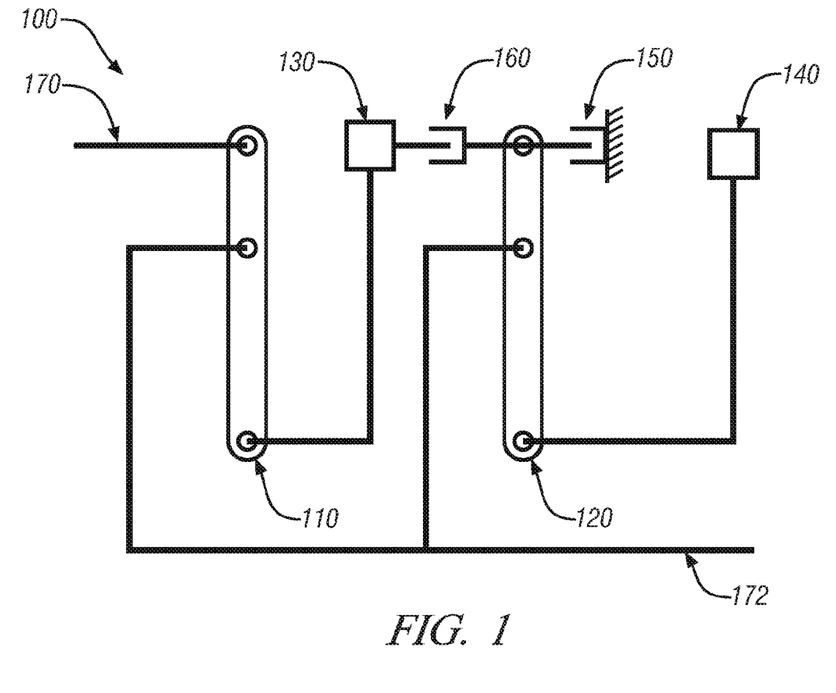
FIG. 1 schematically illustrates an exemplary hybrid powertrain including a pair of planetary gear sets, selectively operable clutches, and torque generative devices, in accordance with the present disclosure.

Referring now to the drawings, wherein the showings are for the purpose of illustrating certain exemplary embodiments only and not for the purpose of limiting the same, FIG. 1 schematically illustrates an exemplary hybrid powertrain including a pair of planetary gear sets and associated selectively operable clutches selectively connecting a plurality of torque generative devices to an output shaft, in accordance with the present disclosure. Configuration 100 includes planetary gear set 110, planetary gear set 120, electric motor A 130, electric motor B 140, output shaft 172, and input shaft 170 connected, for example, to an engine crankshaft providing an engine or input torque.

Clutch 150 selectively connects planetary gear set 120 to ground. Clutch 160 selectively connects motor A 130 to planetary gear set 120. Operation of clutches 150 and 160 controls the function of planetary gear sets 110 and 120 and resulting torque transmission through configuration 100.

Control methods of hydraulic clutches in a powertrain are known in the art. Pressure to the clutch is controlled in order to actuate the clutch from a locked to an unlocked position. In some embodiments, a middle or slip position can be controlled in the clutch. A number of methods to control the pressure to the hydraulic clutch are known and will not be described in detail herein.

Operation of clutches enables different operating states of the powertrain. For example, configuration 100 can utilize a locked clutch 150 and an unlocked clutch 160 to enable a low range continuously variable gear mode (Lo M1). Similarly, configuration 100 can utilize a locked clutch 160 and an unlocked clutch 150 to enable a high range continuously variable gear mode (Hi M2). Similarly, configuration 100 can utilize a locked clutch 150 and a locked clutch 160 to enable a fixed gear mode (fixed gear). Configuration 100 is an exemplary powertrain configuration capable of being used with the methods described herein. However, it will be appreciated that a number of different configurations can be utilized with the methods described herein, and the disclosure is not intended to be limited to the particular disclosed examples.

Figure 2:
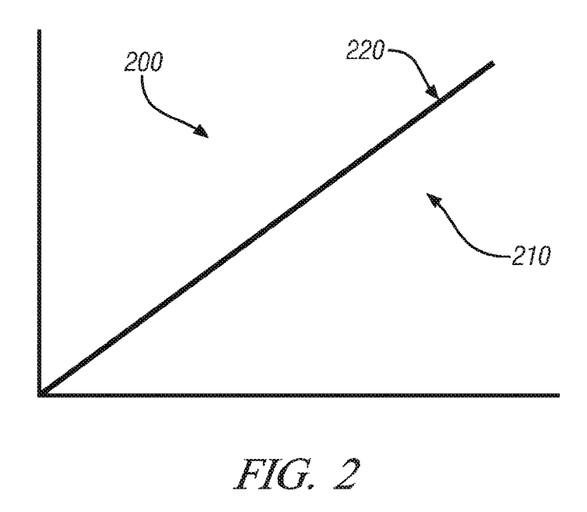
FIG. 2 graphically depicts operation of exemplary states of operation for the exemplary powertrain of FIG. 1, in accordance with the present disclosure.

FIG. 2 graphically depicts operation of exemplary states of operation for the exemplary powertrain of FIG. 1, in accordance with the present disclosure. The x-axis describes an output speed, for example, the speed of output shaft 172 of FIG. 1. The y-axis describes an input speed, for example, the speed of shaft 170 of FIG. 1. A ratio of the output speed over the input speed provides a gear ratio for the powertrain. Line 220 depicts a fixed gear ratio, such that an input speed value provides a predictable output speed value. Region 200 describes operation in a Lo M1 mode, wherein the speed of the output can be controlled relative to the speed of the input, for example, by the operation of motors 130 and 140. The mechanical advantage of the input to the output in the Lo M1 mode includes lower gear ratios, with lower output speeds and higher output torques for a given input, as compared to the Hi M2 mode, described below. The locking of clutch 150 and the unlocking of clutch 160 in Lo M1 mode define the mechanical operation of planetary gear sets 110 and 120 with respect to torque input from shaft 170 and motors 130 and 140. Similarly, region 210 describes operation in a Hi M2 mode, wherein the speed of the output can be controlled relative to the speed of the input, for example, by the operation of motors 130 and 140. The mechanical advantage of the input to the output in the Hi M2 mode includes higher gear ratios, with higher output speeds and lower output torques for a given input, as compared to the Lo M1 mode. The locking of clutch 160 and the unlocking of clutch 150 in Hi M2 mode define the mechanical operation of planetary gear sets 110 and 120 with respect to torque input from shaft 170 and motors 130 and 140. Engagement or disengagement of clutches 150 and 160 determine operation of configuration 100. If both clutches are locked or engaged, then the gear ratio between shaft 170 (input) and 172 (output) is fixed, or the configuration is in the fixed gear state.

Another exemplary type of known clutch includes a selectable one-way clutch (SOWC). Such an SOWC permits rotation in a free-wheeling direction and is rotationally fixed or will not allow rotation in a locked direction. An exemplary one-way clutch includes two concentric rings located such that one fits within the other. Upon the surface whereat the two concentric rings interact, a mechanism is utilized to allow a rotation of the rings in one direction and stop rotation between the rings in the other direction or enabling one-way operation of the clutch. A number of mechanisms enabling the one-way function of the SOWC are known. An exemplary mechanism includes spring loaded tabs that are hinged and oriented around the circumference one of the rings, such that when extended, one of the tabs extends to within the circumference of the other ring and when depressed, the tab fits within the circumference of the ring to which it is hinged. The other ring to which the tabs are not hinged include indented features shaped to either accept the mating tab and rotationally fix the rings together in the locked direction or depress the mating tab into the depressed position permitting rotation in the free-wheeling direction. A number of SOWC designs are known, including sprag-type, strut-type, roller-type, diode-type, or pawl-type and the disclosure is not intended to be limited to the particular exemplary embodiments described within. Actuation of the SOWC selectable function can be accomplished by hydraulic activation, electronic activation, or any other method known in the art, for example, by command from a control module.

In one embodiment, an SOWC can be selected to operate in two states. For example, these two states may include a first state locked in a forward direction and free-wheeling in a reverse direction and a second state free-wheeling in the forward direction and locked in the reverse direction. Alternatively, the two states may include the SOWC being permanently locked in one direction and selectively operable in either a locked or a free-wheeling state in the other direction. Additionally, an SOWC can include three or four selectable states including one way operation in either direction (i.e. locked in one direction and free-wheeling in the other), locked in both directions, or free-wheeling in both directions.

In the exemplary states of operation of configuration 100 described above, in fixed gear mode with torque being applied through the powertrain to the driveline, both clutch 150 and 160 remain locked. However, under some circumstances, operation of a clutch can be selected based upon desired operation of the powertrain or the driveline. For example, a clutch can be locked to provide a driving torque through the powertrain from a torque generative device to a driveline, but the clutch can be selectively unlocked to provide for coasting, permitting the driveline and attached wheels to spin independently of the torque generative device. Such a selective unlocking of the clutch to permit coasting requires a determination of the direction that torque is being transmitted through the clutch. If torque through the clutch is providing torque to the driveline, then the clutch must remain locked. If the torque through the clutch is such that the driveline is providing torque to the torque generative device, then the clutch can be unlocked. Additionally, hybrid transmissions are known to utilize regenerative braking, wherein braking torque to slow the drivetrain, for example, slowing the wheels of a vehicle attached to the drivetrain, can be used to provide torque to a motor or motors in order to provide a charge to an energy storage device for the powertrain. Alternatively, an electric motor can be selectively utilized to regenerate the energy storage device in a regeneration mode or regeneration configuration as a parasitic device, for example, utilizing torque from an engine while the engine is also providing torque to the driveline. Selectively coupling an electric motor associated with regenerative braking or a regeneration mode can include changing a state of a clutch. In this way, selective operation of clutches can be used to permit coasting and managing the state of charge or stored energy level of the energy storage device. However, such selective control through activation and deactivation of a hydraulic clutch can be control intensive and require constant measurement or estimation of the various torques involved in the powertrain, and frequent cycling can shorten the lifespan of the hydraulic clutch involved.

Switching a state of a clutch from locked to unlocked to match a desired function can be simplified through use of an SOWC. For example, as described above, permitting a driveline to coast or be driven by a torque generative device depending upon the direction of torque transmission through the clutch is intensive and requires constant monitoring of the related torques. However, an exemplary SOWC can de selectively activated to transmit torque in a locked state in a forward direction, providing torque from a torque generative device to the driveline, while freewheeling in a reverse direction, permitting the driveline to coast. The same exemplary SOWC can be selected to be locked in both directions to provide for engine braking or regenerative braking depending upon the configuration of the powertrain. Additionally, an open hydraulic clutch includes a substantial drag value, describing power lost to friction within the open clutch. In one exemplary configuration, an open clutch includes a drag of 1.2 N-m. Such a drag value reduces efficiency of the powertrain. A free-wheeling SOWC includes a typically lower drag value. In one exemplary configuration, a free-wheeling SOWC includes a drag of 0.2 N-m. In the exemplary configuration of FIGS. 1 and 2, SOWCs can be utilized in place of one or both clutches 150 and 160 to provide the described functionality of FIG. 2 in forward clutch directions, while providing selectable functions in the reverse directions, such as coasting, engine braking, or regenerative braking.

Figure 3:
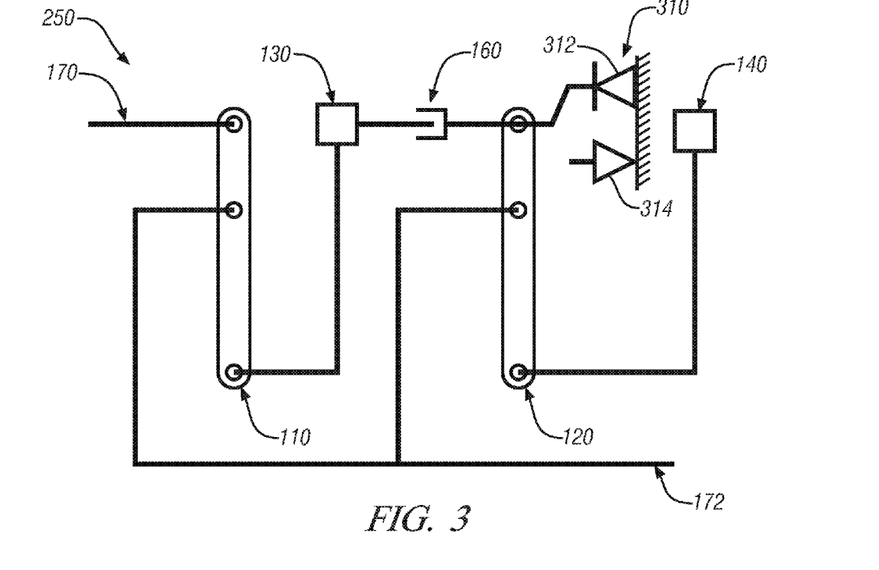
FIG. 3 schematically illustrates an exemplary hybrid powertrain including two planetary gear sets, and selectively operable clutches including one selectable one-way clutch, in accordance with the present disclosure.

FIG. 3 schematically illustrates an exemplary hybrid powertrain including two planetary gear sets and associated selectively operable clutches selectively connecting a plurality of torque generative devices to an output shaft, including one SOWC selectively grounding a gear of one of the planetary gear sets, in accordance with the present disclosure. Configuration 250 includes planetary gear set 110, planetary gear set 120, electric motor A 130, and electric motor B 140. Clutch 160 selectively connects motor A 130 to planetary gear set 120. SOWC 310 selectively connects a gear of planetary gear set 120 to ground. Position 312 corresponds to the SOWC 310 grounding in a first or forward direction and free-wheeling in a second or reverse direction. Position 314 corresponds to the SOWC 310 free-wheeling in the first or forward direction and grounding in the second or reverse direction. Operation of clutch 160 and SOWC 310 controls the function of planetary gear sets 110 and 120 and resulting torque transmission through configuration 250. Positions 312 and 314 are exemplary states that can be set in SOWC 310; however, different SOWC configurations enabling different selectable states or different numbers of selectable states can be utilized, and the disclosure is not intended to be limited to the particular exemplary embodiments described herein.

Table 1 illustrates transmission setting selections and accompanying SOWC 310 and clutch 160 states for the exemplary configuration of FIG. 3.

directions). And, "F(FW)/Neutral" corresponds to SOWC 310 operated in a reverse one-way state (i.e. engaging in the reverse direction and free free-wheeling in the forward direction) or operated in a disengaged state (i.e. free-wheeling in both the forward and reverse directions). Table 1 also illustrates exemplary states for clutch 160, including engaged, with the clutch locked and capable of transmitting torque, and disengaged, with the clutch fully slipping and having no significant torque transmitting capacity. The illustrated states of SOWC 310 and clutch 160 can be used to accomplish the depicted exemplary transmission gear settings. It will be appreciated that the list of transmission setting selections described is not exhaustive, and depending upon the particular configuration of the transmission or powertrain, different transmission setting selections are possible.

Figure 4:
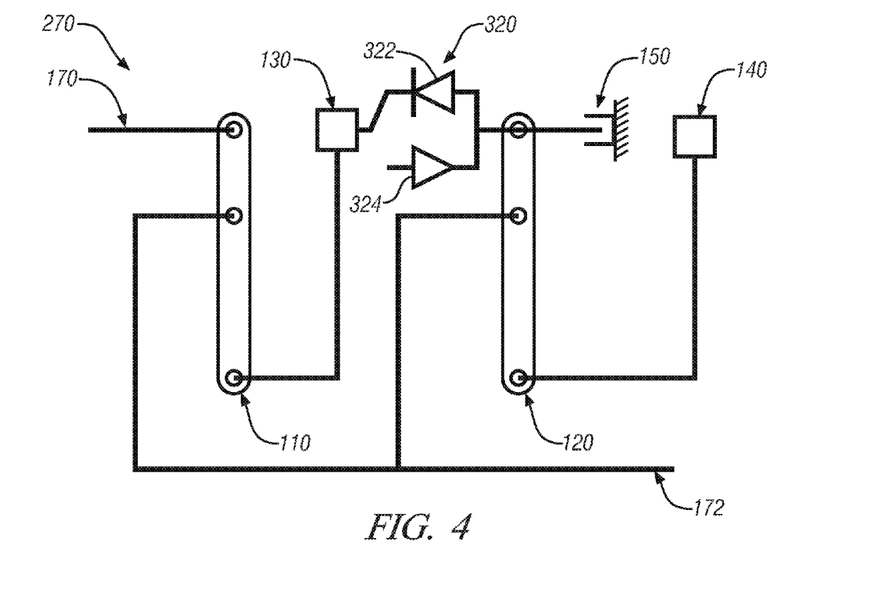
FIG. 4 schematically illustrates an exemplary hybrid powertrain including two planetary gear sets, and selectively operable clutches including one selectable one-way clutch, in accordance with the present disclosure.

FIG. 4 schematically illustrates an exemplary hybrid powertrain including two planetary gear sets and associated selectively operable clutches selectively connecting a plurality of torque generative devices to an output shaft, including one SOWC selectively connecting a motor to one of the planetary gear sets, in accordance with the present disclosure. Configuration 270 includes planetary gear set 110, planetary gear set 120, electric motor A 130, and electric motor B 140. Clutch 150 selectively grounds a gear of planetary gear set 120. SOWC 320 selectively connects motor 130 to the same gear of planetary gear set 120. Position 322 corresponds to SOWC 320 locked in a first or forward direction and free-wheeling in a second or reverse direction. Position 324 corresponds to SOWC 320 free-wheeling in the first or forward direction and locked in the second or reverse direction. Operation of clutch 150 and SOWC 320 controls the function of planetary gear sets 110 and 120 and resulting torque transmission through configuration 270. Positions 322 and 324 are exemplary states that can be set in SOWC 320; however, different SOWC configurations enabling different selectable states or different numbers of selectable states can be utilized, and the disclosure is not intended to be limited to the particular exemplary embodiments described herein.

Table 2 illustrates transmission setting selections and accompanying SOWC 320 and clutch 150 states for the exemplary configuration of FIG. 4.

TABLE 1

| Transmission Setting Selection | SOWC 310 | Clutch 160 |
| --- | --- | --- |
| Lo M1 (Rev) | R/Lock | Disengaged |
| Lo M1 (Fwd) | F/Lock | Disengaged |
| Lo M1 (ReGen) | R/Lock | Disengaged |
| Fixed Gear | F/Lock | Engaged |
| Hi M2 | F(FW)/Neutral | Engaged |
| Hi M2 (ReGen) | F(FW)/Neutral | Engaged |

TABLE 2

| Transmission Setting Selection | Clutch 150 | SOWC 320 |
| --- | --- | --- |
| Lo M1 (Rev) | Engaged | R(FW)/Neutral |
| Lo M1 (Fwd) | Engaged | R(FW)/Neutral |
| Lo M1 (ReGen) | Engaged | R(FW)/Neutral |
| Fixed Gear | Engaged | F/Lock |
| Hi M2 | Disengaged | F/Lock |
| Hi M2 (ReGen) | Disengaged | Lock |

Operation in the Lo M1, Hi M2, and fixed gear modes are described above in association with FIG. 2. Mode Lo M1 can be operated in a forward (Fwd) configuration or mode, with the driveline operating in a forward direction, and a reverse (Rev) configuration or mode, with the driveline operation in a reverse direction. Further, either the Lo M1 or Hi M2 modes can operate in a regeneration (ReGen) configuration or mode. In Table 1, "F/Lock" corresponds to SOWC 310 operated in a forward one-way state (i.e. engaging in the forward direction and free free-wheeling in the reverse direction) or operated in a locked state (i.e. engaging in both the forward and reverse directions). "R/Lock" corresponds to SOWC 310 operated in a reverse one-way state (i.e. engaging in the reverse direction and free free-wheeling in the forward direction) or operated in the locked state (i.e. engaging in both the forward and reverse Operation in the Lo M1, Hi M2, and fixed gear modes are described above in association with FIG. 2. Mode Lo M1 can be operated in a forward (Fwd) configuration or mode, with the driveline operating in a forward direction, and a reverse (Rev) configuration or mode, with the driveline operation in a reverse direction. Further, either the Lo M1 or Hi M2 modes can operate in a regeneration (ReGen) configuration or mode. In Table 2, "Lock" corresponds to SOWC 320 operated in a locked state (i.e. engaging in both the forward and reverse directions). "F/Lock" corresponds to SOWC 320 operated in a forward one-way state (i.e. engaging in the forward direction and free-wheeling in the reverse direction) or operated in a locked state (i.e. engaging in both the forward and reverse directions). And, "R(FW)/Neutral" corresponds to SOWC 320 operated in a forward one-way state (i.e. engaging in the forward direction and free free-wheeling in the reverse direction) or operated in a disengaged state (i.e. free-wheeling in both the forward and reverse directions). Table 2 also illustrates exemplary states for clutch 150, including engaged, with the clutch locked and capable of transmitting torque, and disengaged, with the clutch fully slipping and having no significant torque transmitting capacity. The illustrated states of SOWC 320 and clutch 150 can be used to accomplish the depicted exemplary transmission gear settings. It will be appreciated that the list of transmission setting selections described is not exhaustive, and depending upon the particular configuration of the transmission or powertrain, different transmission setting selections are possible.

Figure 5:
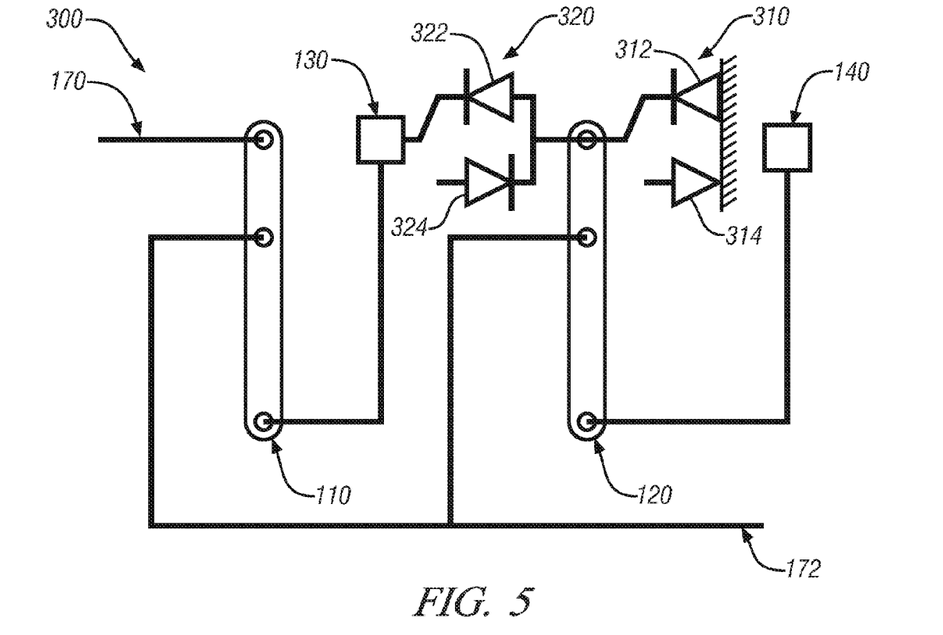
FIG. 5 schematically illustrates an exemplary hybrid powertrain including two planetary gear sets, selectively operable clutches including two selectable one-way clutches, in accordance with the present disclosure.

FIG. 5 schematically illustrates an exemplary hybrid powertrain including two planetary gear sets and associated selectively operable clutches selectively connecting a plurality of torque generative devices to an output shaft, including two SOWCs, in accordance with the present disclosure. Configuration 300 includes planetary gear set 110, planetary gear set 120, electric motor A 130, and electric motor B 140. SOWC 310 selectively connects a gear of planetary gear set 120 to ground. Position 312 corresponds to the SOWC 310 grounding in a first or forward direction and free-wheeling in a second or reverse direction. Position 314 describes the SOWC 310 free-wheeling in the first or forward direction and grounding in the second or reverse direction. SOWC 320 selectively connects motor A 130 to the same gear of planetary gear set 120 that is selectively connected to ground by SOWC 310. Position 322 corresponds to SOWC 320 locked in a first or forward direction and free-wheeling in a second or reverse direction. Position 324 corresponds to SOWC 320 free-wheeling in the first or forward direction and locked in the second or reverse direction. Positions 312, 314, 322, and 324 are exemplary states that can be set in SOWC 310 and SOWC 320; however, different SOWC configurations enabling different selectable states or different numbers of selectable states can be utilized, and the disclosure is not intended to be limited to the particular exemplary embodiments described herein.

Table 3 illustrates transmission setting selections and accompanying SOWC 320 and SOWC 310 states for the exemplary configuration of FIG. 5.

TABLE 3

| Transmission Setting Selection | SOWC 310 | SOWC 320 |
|---|---|---|
| Lo M1 (Rev) | R/Lock | R(FW)/Neutral |
| Lo M1 (Fwd) | F/Lock | R(FW)/Neutral |
| Lo M1 (ReGen) | R/Lock | R(FW)/Neutral |
| Fixed Gear | F/Lock | F/Lock |
| Hi M2 | F(FW)/Neutral | F/Lock |
| Hi M2 (ReGen) | F(FW)/Neutral | Lock |

Operation in the Lo M1, Hi M2, and fixed gear modes are described above in association with FIG. 2. Mode Lo M1 can be operated in a forward (Fwd) configuration or mode, with the driveline operating in a forward direction, and a reverse (Rev) configuration or mode, with the driveline operation in a reverse direction. Further, either the Lo M1 or Hi M2 modes can operate in a regeneration (ReGen) configuration or mode. In Table 3, "F/Lock" corresponds to SOWC 310 or SOWC 320 as the case may be operated in a forward one-way state (i.e. engaging in the forward direction and free free-wheeling in the reverse direction) or operated in a locked state (i.e. engaging in both the forward and reverse directions). "R/Lock" corresponds to SOWC 310 operated in a reverse one-way state (i.e. engaging in the reverse direction and free free-wheeling in the forward direction) or operated in the locked state (i.e. engaging in both the forward and reverse directions). "F(FW)/Neutral" corresponds to SOWC 310 operated in a reverse one-way state (i.e. engaging in the reverse direction and free free-wheeling in the forward direction) or operated in a disengaged state (i.e. free-wheeling in both the forward and reverse directions). "Lock" corresponds to SOWC 320 operated in a locked state (i.e. engaging in both the forward and reverse directions). And, "R(FW)/Neutral" corresponds to SOWC 320 operated in a forward one-way state (i.e. engaging in the forward direction and free free-wheeling in the reverse direction) or operated in a disengaged state (i.e. free-wheeling in both the forward and reverse directions). The illustrated states of SOWC 310 and SOWC 320 can be used to accomplish the depicted exemplary transmission gear settings. It will be appreciated that the list of transmission setting selections described is not exhaustive, and depending upon the particular configuration of the transmission or powertrain, different transmission setting selections are possible.

Figure 6:
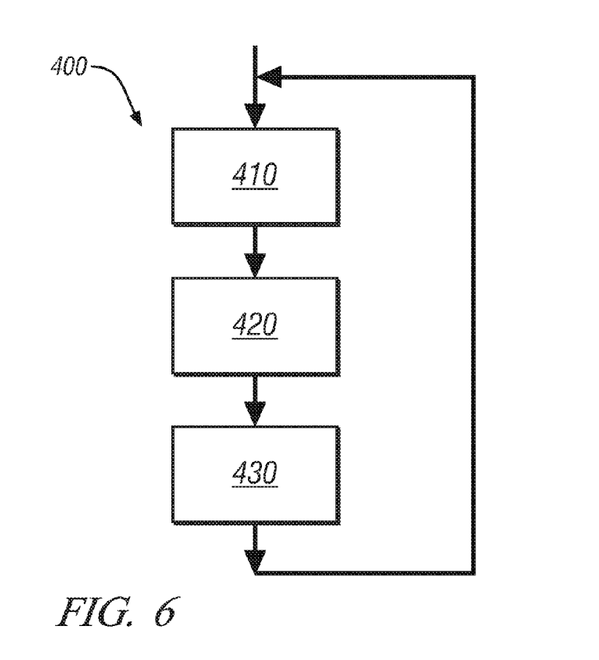
FIG. 6 depicts an exemplary process suitable for execution within a control module, in accordance with the present disclosure.

FIG. 6 depicts an exemplary control process 400 preferably employed within a control module for establishing a transmission setting. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. Process 400 can be exemplified by the process steps illustrated in Table 4.

TABLE 4

| Block/Step | Block Contents |
|---|---|
| 410 | Monitor desired transmission setting selection |
| 420 | Determine desired SOWC commands based upon the desired transmission setting selection |
| 430 | Command a plurality of SOWCs based upon the desired SOWC commands |

At step 410, a desired transmission setting selection is monitored, for example, by monitoring a desired torque transmission condition through the transmission. Through use of predetermined SOWC settings, enabling selection of clutch states for each SOWC (zero slip for engagement, zero torque for disengagement), corresponding to the various transmission setting selections possible for a transmission, for example as described in Tables 1-3, commands to the various SOWCs can be determined and utilized. For example, a control module managing the gear state and requested operation of the torque generative devices of the powertrain can provide the present mode of operation of the powertrain (Lo M1, Hi M2, fixed gear, etc.,) while another control module managing the energy storage device can request activation of a regeneration mode or configuration. In one embodiment, the same control module can manage both the mode of operation of the powertrain and activation of the regeneration mode. At step 420, based upon this desired transmission setting selection, desired SOWC commands selecting the state of the related SOWCs is determined. According to one exemplary embodiment, a look-up table embodying Table 1, 2, or 3, corresponding to the particular powertrain, can be utilized. At step 430, based upon the desired SOWC commands, the control module commands the related SOWCs to achieve the required SOWC states to operate at the desired transmission setting selection. A number of processes to accomplish the methods described herein are envisioned, and the disclosure is not intended to be limited to the particular exemplary embodiment described herein.

Figure 7:
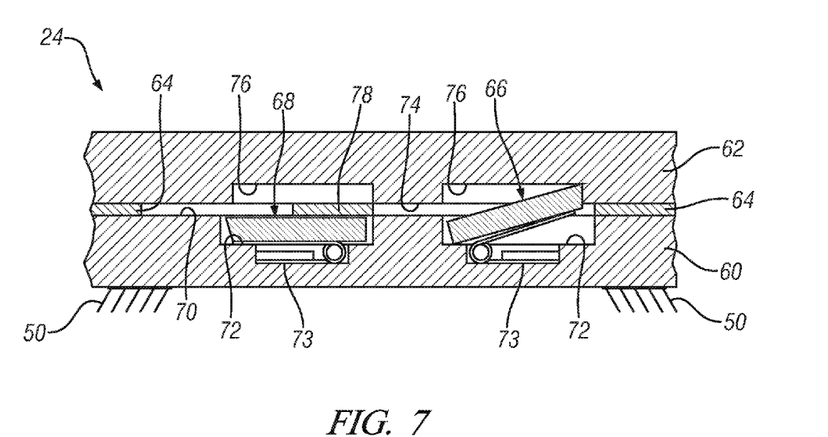
FIGS. 7 and 8 depict cross-sectional views of a selectable one-way clutch in various activated positions, in accordance with the present disclosure.
Figure 8:
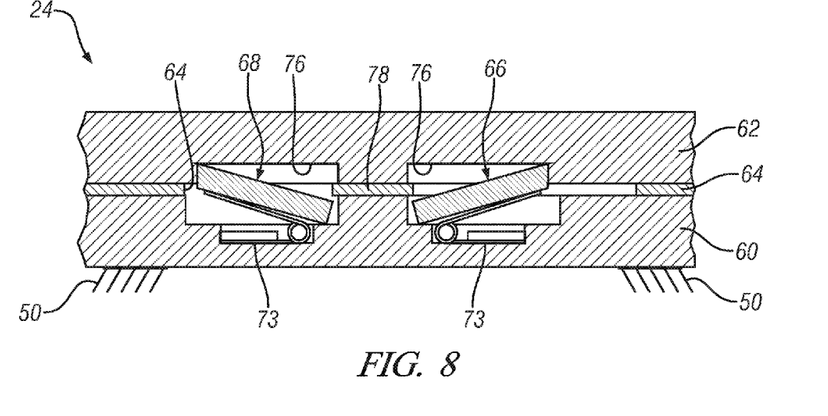

Referring now to FIGS. 7 and 8, two cross-sectional views of an exemplary SOWC 24 illustrate, respectively, a one-way state (locked in one direction and freewheeling in the other) and a locked state (locked in both directions). Exemplary SOWC 24 is an exemplary embodiment of either of SOWC 310 or SOWC 320 depicted in FIGS. 3-5. In the embodiment as shown, the SOWC 24 is a strut-type selectable one-way clutch having a plurality of forward and reverse struts that are locking mechanisms used to provide a mechanical connection between rotating members. However, those skilled in the art will appreciate that other types of selectable one-way clutches employing other types of locking mechanisms may be used as well. The selectable one-way clutch includes an input disc or member 60, an output disc or member 62, a selection disc or member 64, a selection disc actuator, a forward locking mechanism 66 and a reverse locking mechanism 68. The selectable one-way clutch is selectively controlled to connect a shaft or interconnecting member with a stationary element or ground, for example, with transmission housing 50. The input member 60 is fixed to a stationary member or transmission housing 50. The output member 62 is rotationally connected to the second shaft or interconnecting member. The selection disc 64 is disposed between the input and output discs 60, 62 and remains stationary relative to the input disc 60 except when activated by the selection disc actuator.

The input member 60 has a surface 70 that includes a plurality of recesses 72. One of the forward and reverse locking mechanisms 66, 68 is mounted in each recess. The output member 62 has a surface 74 facing the first surface 70 of the input member 60 and includes recesses 76 for receiving and engaging the locking mechanisms 66, 68. A respective biasing member such as a spring 73 urges each locking mechanisms 66, 68 out of the corresponding recess 72 and into the locked position. The selection disc 64 includes an actuation feature 78 that when activated as in FIG. 7 and rotated over the reverse locking mechanism 68 prevents the reverse locking mechanism 68 from engaging with one of the recesses 76 of the output member 62. Such a configuration establishes a reverse one-way state permitting free-wheeling in the forward direction while locking in the reverse direction. When actuation feature 78 is activated as in FIG. 8 and rotates over the reverse locking mechanism 68, both locking mechanisms 66, 68 are in the locked position engaging with a respective one of the recesses 76 of the output member 62. Such a configuration establishes a locked state locking rotation in both directions.

SOWC 24 can include up to four states of operation. For example, the SOWC 24 may also include free-wheeling in both directions. In such a state, both the locking mechanisms 66 and 68 are depressed into their respective recesses 72 located in the input member 60. The SOWC 24 may also include a forward one-way state permitting free-wheeling in the reverse direction while locking in the forward direction.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to control torque applied through a powertrain to a driveline, the powertrain comprising a plurality of torque generative devices and a transmission comprising an output shaft, a plurality of planetary gear sets connecting the torque generative devices to the output shaft, a first and second selectable one-way clutches connected to a first of the planetary gear sets, a control module configured to execute the method comprising:
   monitoring a desired transmission setting selection comprising one of a low range continuously variable gear mode, a high range continuously variable gear mode, and a fixed gear mode, the low range continuously variable gear mode comprising one of the low range continuously variable gear mode operating in a forward configuration with the driveline operating in a forward direction and the low range continuously variable gear mode operating in a reverse configuration with the driveline operating in a reverse direction;
   determining a desired state for the first and second selectable one-way clutches based upon the desired transmission setting selection; and
   actuating the first and second selectable one-way clutches to effect the desired state for the first and second selectable one-way clutches comprising,
      when the desired transmission setting selection is the low range continuously variable gear mode operating in the reverse configuration with the driveline operating in the reverse direction, selectively locking only the first selectable one-way clutch in a reverse direction of rotation to ground a gear of the first of the planetary gear sets and freewheeling only the second selectable one-way clutch in a reverse direction of rotation.

2. The method of claim 1, wherein the first selectable one-way clutch selectively grounds a gear of the first of the planetary gear sets.

3. The method of claim 1, wherein the second selectable one-way clutch selectively connects a gear of the first of the planetary gear sets to one of the torque generative devices comprising a motor.

4. The method of claim 1, wherein monitoring the desired transmission setting selection further comprises monitoring a desired torque transmission condition through the transmission.

5. The method of claim 1, wherein the desired transmission setting selection further comprises the low range continuously variable gear mode operating in a regeneration configuration.

6. The method of claim 1, wherein the desired transmission setting selection further comprises the high range continuously variable gear mode operating in a regeneration configuration.

7. The method of claim 1, wherein actuating the first and second selectable one-way clutches further comprises for each of the first and second selectable one-way clutches selectively locking the first and second selectable one-way clutches in a first direction of rotation when the desired transmission setting selection is not in the low range continuously variable gear mode operating in the reverse configuration with the driveline operating in the reverse direction.

8. The method of claim 1, wherein actuating the first and second selectable one-way clutches further comprises for each of the first and second selectable one-way clutches selectively locking the first and second selectable one-way clutches in a first direction of rotation and a second direction of rotation when the desired transmission setting selection is not in the low range continuously variable gear mode operating in the reverse configuration with the driveline operating in the reverse direction.

9. The method of claim 1, wherein the desired transmission setting selection is the fixed gear mode; and
wherein actuating the plurality of selectable one-way clutches comprises selectively grounding a gear of a second of the planetary gear sets.

10. A method to control torque applied through a powertrain to a driveline, the powertrain comprising two motors, an input shaft, an output shaft, two planetary gear sets connecting the motors and the input shaft to the output shaft, and two selectable one-way clutches, a control module configured to execute the method comprising:
monitoring a desired transmission setting selection comprising one of a low range continuously variable gear mode, a high range continuously variable gear mode, and a fixed gear mode, the low range continuously variable gear mode comprising one of the low range continuously variable gear mode operating in a forward configuration with the driveline operating in a forward direction and the low range continuously variable gear mode operating in a reverse configuration with the driveline operating in a reverse direction;
determining desired selectable one-way clutch commands based upon the desired transmission setting selection; and
commanding the selectable one-way clutches based upon the desired selectable one-way clutch commands comprising,
when the desired transmission setting selection is the low range continuously variable gear mode operating in the reverse configuration with the driveline operating in the reverse direction, selectively locking only a first of the selectable one-way clutches in a reverse direction of rotation to ground a gear of the first of the planetary gear sets and freewheeling only a second of the selectable one-way clutches in a reverse direction of rotation;
wherein the first of the selectable one-way clutches selectively grounds a gear of a first of the planetary gear sets; and
wherein the second of the selectable one-way clutches selectively engages one of the motors to the gear of the first of the planetary gear sets.

11. The method of claim 10, wherein the desired transmission setting selection is the fixed gear mode; and
wherein commanding the selectable one-way clutches further comprises commanding both of the selectable one-way clutches to lock in a forward direction when the desired transmission setting selection is not in the low range continuously variable gear mode operating in the reverse configuration with the driveline operating in the reverse direction.

12. The method of claim 10, wherein the desired transmission setting selection comprises a regeneration configuration; and
wherein commanding the selectable one-way clutches further comprises commanding both the selectable one-way clutches to transmit torque from the output shaft to one of the motors.

13. A system to transmit torque within a powertrain, comprising:
a pair of motors;
an output shaft;
a pair of planetary gear sets connecting the motors to the output shaft;
a pair of selectable one-way clutches, each connected to one of the planetary gear sets;
each motor connected to one of the planetary gear sets;
an input shaft connected to one of the planetary gear sets;
the output shaft connected to each planetary gear set; and
a control module configured to:
monitor a desired transmission setting selection comprising one of a low range continuously variable gear mode, a high range continuously variable gear mode, and a fixed gear mode, the low range continuously variable gear mode comprising one of the low range continuously variable gear mode operating in a forward configuration with the driveline operating in a forward direction and the low range continuously variable gear mode operating in a reverse configuration with the driveline operating in a reverse direction;
determine selectable one-way clutch commands based upon the desired transmission setting selection; and
command the one-way clutches based upon the selectable one-way clutch commands comprising,
when the desired transmission setting selection is the low range continuously variable gear mode operating in the reverse configuration with the driveline operating in the reverse direction, selectively locking only the first selectable one-way clutch in a reverse direction of rotation to ground a gear of the first of the planetary gear sets and freewheeling only the second selectable one-way clutch in a reverse direction of rotation.

14. The system of claim 13, further comprising an energy storage device providing power to each of the motors; and
wherein monitoring the desired transmission setting selection further comprises monitoring a regeneration configuration.

15. The system of claim 13, wherein the control module configured to monitor the desired transmission setting selection further comprises the control module further configured to:
monitor a low range continuously variable gear mode operating in a forward configuration;
monitor a low range continuously variable gear mode operating in a reverse configuration;
monitor a low range continuously variable gear mode operating in a regeneration configuration; and
monitor a high range continuously variable gear mode operating in a regeneration configuration;
wherein a first of the selectable one-way clutches selectively grounds a gear of a first of the planetary gear sets;
wherein a second of the selectable one-way clutches selectively connects one of the motors to the gear of the first of the planetary gear sets; and
wherein determining the selectable one-way clutch commands comprises:

when the desired transmission setting selection comprises the fixed gear mode, the desired selectable one-way clutch commands comprise locking each of the two selectable one-way clutches in a forward direction of rotation;

when the desired transmission setting selection comprises the high range continuously variable gear mode, the desired selectable one-way clutch commands comprise free-wheeling the first of the selectable one-way clutches in a forward direction of rotation and locking the second of the selectable one-way clutches in a forward direction of rotation;

when the desired transmission setting selection comprises the high range continuously variable gear mode operating in the regeneration configuration, the desired selectable one-way clutch commands comprise free-wheeling the first of the selectable one-way clutches in a forward direction of rotation and locking the second of the selectable one-way clutches in each direction of rotation;

when the desired transmission setting selection comprises the low range continuously variable gear mode operating in the forward configuration, the desired selectable one-way clutch commands comprise locking the first of the selectable one-way clutches in a forward direction of rotation and free-wheeling the second of the selectable one-way clutches in a reverse direction of rotation;

and when the desired transmission setting selection comprises the low range continuously variable gear mode operating in the regeneration configuration, the desired selectable one-way clutch commands comprise locking the first of the selectable one-way clutches in a reverse direction of rotation and free-wheeling the second of the selectable one-way clutches in a reverse direction of rotation.

* * * * *